US007652588B2

(12) United States Patent
Lopez Barbarin

(10) Patent No.: US 7,652,588 B2
(45) Date of Patent: Jan. 26, 2010

(54) SIGNALLING ELEMENT

(75) Inventor: Javier Lopez Barbarin, Noain (ES)

(73) Assignee: Barbolight, S.L., Noain Navarra (ES)

( * ) Notice: Subject to any disclaimer, the term of this patent is extended or adjusted under 35 U.S.C. 154(b) by 222 days.

(21) Appl. No.: 11/798,895

(22) Filed: May 17, 2007

(65) Prior Publication Data

US 2007/0273547 A1 Nov. 29, 2007

(30) Foreign Application Priority Data

May 18, 2006 (ES) ............................ 200601136 U

(51) Int. Cl.

| | |
|---|---|
| ***G08B 23/00*** | (2006.01) |
| ***B60Q 7/00*** | (2006.01) |
| ***G08B 5/00*** | (2006.01) |
| ***G08B 5/22*** | (2006.01) |
| ***F21V 7/00*** | (2006.01) |
| ***F21V 3/00*** | (2006.01) |
| ***F21V 11/00*** | (2006.01) |
| ***F21V 7/04*** | (2006.01) |

(52) U.S. Cl. .................. 340/815.42; 340/321; 340/473; 340/815.45; 340/908; 362/350; 362/352; 362/551; 362/577; 362/582; 362/296.01; 362/296.02; 362/311.01

(58) Field of Classification Search ................. 340/321, 340/473, 907, 908, 815.42, 815.45; 362/551–582, 362/577, 293, 296

See application file for complete search history.

(56) References Cited

U.S. PATENT DOCUMENTS 3,742,210 A * 6/1973 Chapman .................... 362/350
3,787,676 A * 1/1974 Korach ....................... 362/352
4,697,228 A * 9/1987 Mui et al. ................... 362/352
4,913,437 A * 4/1990 Newcomb et al. ........... 473/220
5,081,568 A 1/1992 Dong et al.
5,374,876 A * 12/1994 Horibata et al. ............. 315/313
5,406,300 A * 4/1995 Tokimoto et al. ............. 345/31
5,519,593 A * 5/1996 Hasness ....................... 362/186
5,642,931 A 7/1997 Gappelberg
5,980,063 A * 11/1999 Ford et al. .................. 362/186
6,082,876 A * 7/2000 Hanson et al. .............. 362/293
6,293,684 B1 * 9/2001 Riblett ....................... 362/184
6,315,434 B1 * 11/2001 Long .......................... 362/352
6,404,409 B1 * 6/2002 Solomon ..................... 345/31

(Continued)

FOREIGN PATENT DOCUMENTS

GB 1 309 879 3/1973

OTHER PUBLICATIONS

European Search Report issued Sep. 11, 2007 in connection with EP 07 38 0140 corresponding to the present U.S. patent application.

*Primary Examiner*—Benjamin C Lee
*Assistant Examiner*—Lam P Pham
(74) *Attorney, Agent, or Firm*—Wenderoth, Lind & Ponack L.L.P.

(57) ABSTRACT

A signalling element, which can be adapted to a light emitter, such as a lamp, the element for signalling includes an external double laminar body of plastic material, with a tronco-conical general shape extended by its larger base into a straight section and open via said larger base, housing two plastic layers of PVC and in its interior, the the external double laminar body defining a space for housing the pair of layers.

10 Claims, 3 Drawing Sheets

U.S. PATENT DOCUMENTS 6,641,280 B2 * 11/2003 Hanson et al. .............. 362/186
7,030,420 B2 * 4/2006 Shimomura et al. ........... 257/88
7,142,173 B2 * 11/2006 Bentley ....................... 345/31
7,261,456 B2 * 8/2007 Liu ............................ 362/577
7,278,769 B2 * 10/2007 Dick .......................... 362/553
7,287,874 B2 * 10/2007 Irisawa ....................... 362/233

* cited by examiner

SIGNALLING ELEMENT

FIELD OF THE INVENTION

The present specification relates to a signalling element, which can have applications in many different operations of signalling and marking. For example, the signalling element has special applications for use by police, the military, emergency personnel, etc., primarily in the event of accidents and risk situations.

Likewise, the element that is presented herein, can adapt to a light emitter such as a lamp, and has application as a portable light source in situations of low visibility.

PRIOR ART OF THE INVENTION

As is known, situations regularly occur in which it is necessary to have a signal and that signal needs to be as visible as possible. Such visibility being necessary primarily in situations of a certain emergency or danger, for which the police force, the military and emergency personnel need to be able to have means of signalling or marking.

So, in signalling or marking, use is normally made of reflecting and/or luminous elements are typically used, with such luminous signalling being of special use in conditions of low visibility.

In this manner, when signalling, regulation or guiding of traffic has to be carried out, it can be done by means of reflecting and/or luminous elements, such that, when in conditions of low visibility, the luminous signalling has to be used in order to be able to obtain adequate signalling. To achieve this, lamps are used that are provided with a rigid accessory made of plastic material and have the shape of a cone.

These accessories made of a rigid plastic material in the shape of a cone are not reflecting, they take up a certain amount of space, they are relatively heavy and their visibility is somewhat low. They, therefore, cannot be carried directly by the personnel who are going to use them but must instead be transported on vehicles and gathered up for being used.

SUMMARY OF THE INVENTION

This invention relates to a signalling element, able to be adapted to a light emitter with the aim of obtaining high visibility.

Likewise, as it concerns a reflecting signalling element, it reflects incident light granting it high visibility, even in ambient conditions of low visibility.

Moreover, since the signalling element has an interior and is based on a double laminar external body of plastic material housing two reflecting plastic layers of PVC in the interior, the signalling element can be folded up in order to occupy minimum space, thus facilitating placement in a simple pocket by the user, and being able to be used when necessary. The present specification describes a signalling element, which can be adapted to a light emitter, with an object of obtaining high visibility, such that the signalling element includes of an external double laminar body of plastic material, with a tronco-conical general shape extended by its larger base into a straight section and open via the larger base, housing two reflecting plastic layers of PVC in its interior, permitting its folding and occupying a minimum space, thus facilitating its housing in a simple pocket by the user who can make use of it at any moment.

In this way, the external double laminar body of transparent plastic material defines a space for housing the pair of reflecting and translucent micro-prismatic PVC plastic layers.

The external double laminar body of plastic material likewise displays suitable flexibility.

The pair of internal reflecting and translucent PVC plastic layers can be with or without coloration, such that, as they can display variable coloration, their application can be extended to different types of signalling or communications.

In short, the external double laminar body of flexible transparent plastic material is adaptable via its larger open base to a light emitter such as a lamp, with the external double laminar body displaying adequate rigidity for its static mounting in the same.

In order to complement the description to be made forthwith, and with the aim of aiding a better understanding of the characteristics of the invention, this descriptive specification is accompanied by a set of drawings containing figures which, on an illustrative rather than limiting basis, the most characteristic details of the invention are represented.

DESCRIPTION OF A PREFERRED EMBODIMENT

Figure 1:
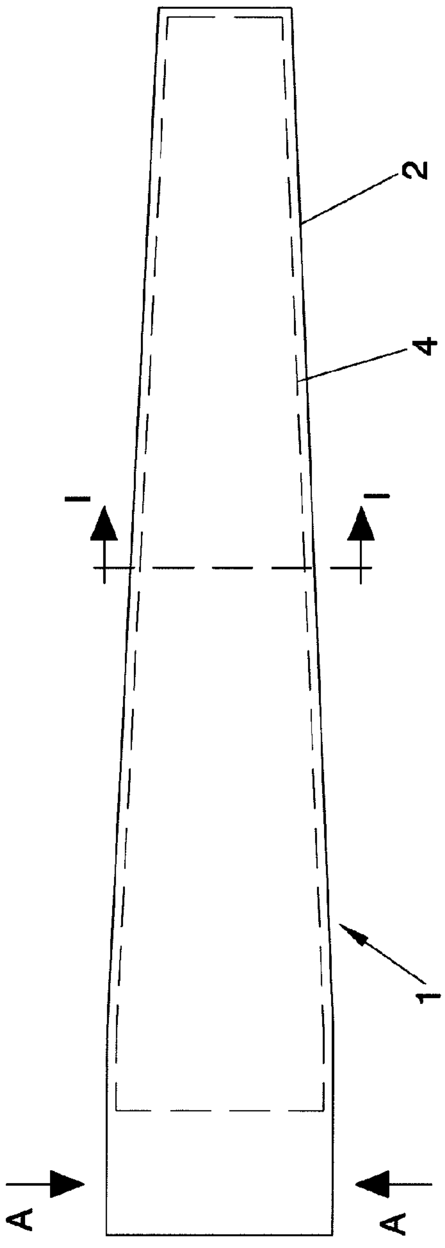
FIG. 1 shows a view of the signalling element forming the inventive object, where its generally tronco-comical shape can be seen with a straight extension via its larger base.
Figure 4:
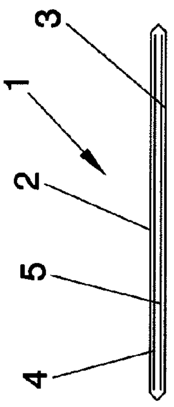
FIG. 4 shows a section view along the cut I-I of FIG. 1, via the larger base of the element of the previous figure, where the external double laminar body can be seen along with the pair of layers the external double laminar body houses.

In view of FIGS. 1-8 and in accordance with the reference numerals, it can be seen that the signalling element 1 includes an external double laminar body 2-3 of plastic material, with a tronco-conical general shape extended by a larger base into a straight section and open via the larger base, housing two reflecting and translucent plastic layers 4 and 5 of PVC in its interior.

The external double laminar body 2-3 of transparent and flexible material defines a space for housing the pair of plastic layers 4 and 5.

Moreover, the pair of internal reflecting and translucent PVC plastic layers 4 and 5 can be considered with or without coloration, so that considerable color variations are possible for signalling and communications.

The external double laminar body 2-3 of flexible transparent plastic material is adaptable via its larger open base to a light emitter such as a lamp 6, with the external double laminar body displaying adequate rigidity for its static mounting in the same.

As illustrated in the figures, element 1 having a minimum volume and a very light weight can be used as an accessory that is easy and simple to transport since, when folded, element 1 occupies minimum space and can be stored in a pocket, such that the personnel who use element 1 will be able to carry it in a pocket and make use thereof, instantaneously, when necessary.

Figure 3:
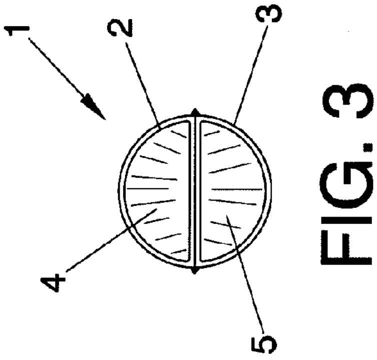
FIG. 3 shows a front view via the larger base of the element of the previous figure, where it can be seen how, due to the flexibility of the external double laminar body, the element is able to adopt a rounded configuration via the larger base.
Figure 2:
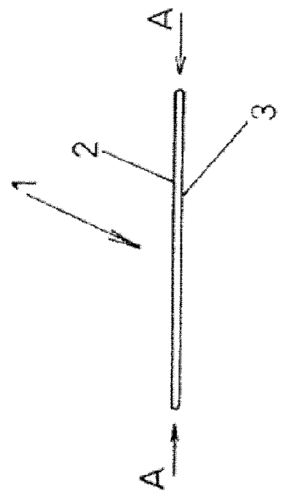
FIG. 2 shows a front view via the larger base of the element of the previous figure, where its laminar arrangement when at rest can be seen.
Figure 5:
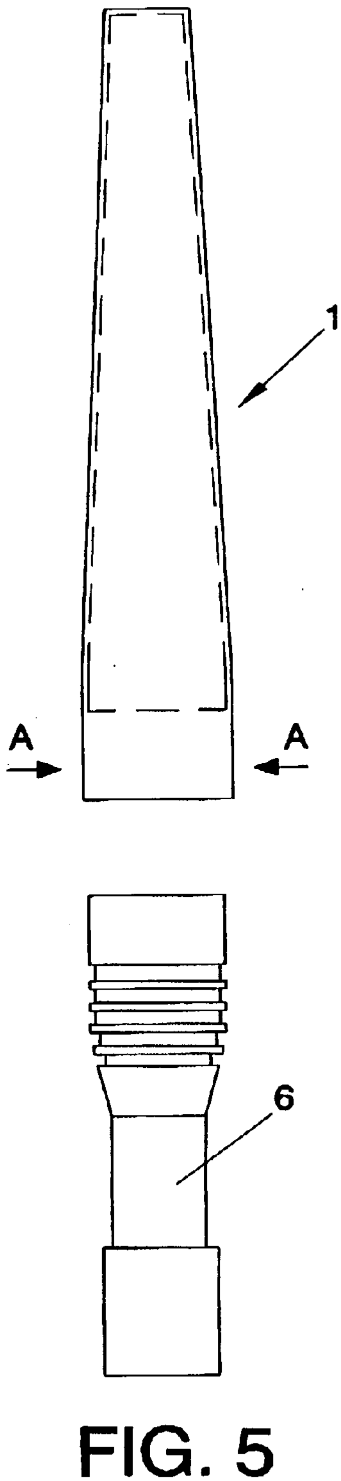
FIG. 5 shows a view of the signalling element ready for adaptation to a lamp.
Figure 6:
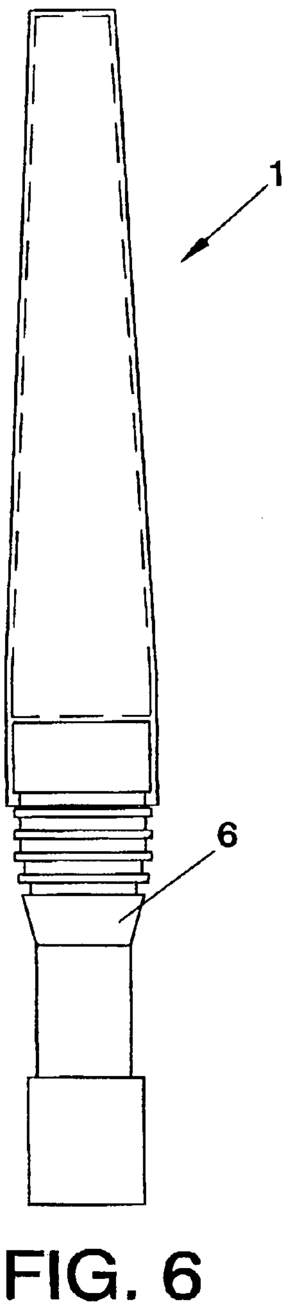
FIG. 6 shows a view of the signalling element adapted to a lamp being fitted in the static position.
Figure 7:
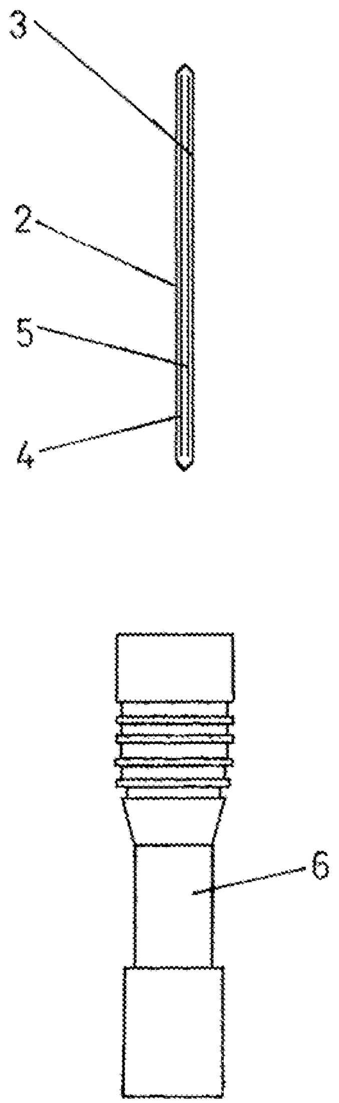
FIG. 7 shows the signalling element of FIG. 5 ready for adaption to a lamp from a different orientation (i.e., 90° offset).
Figure 8:
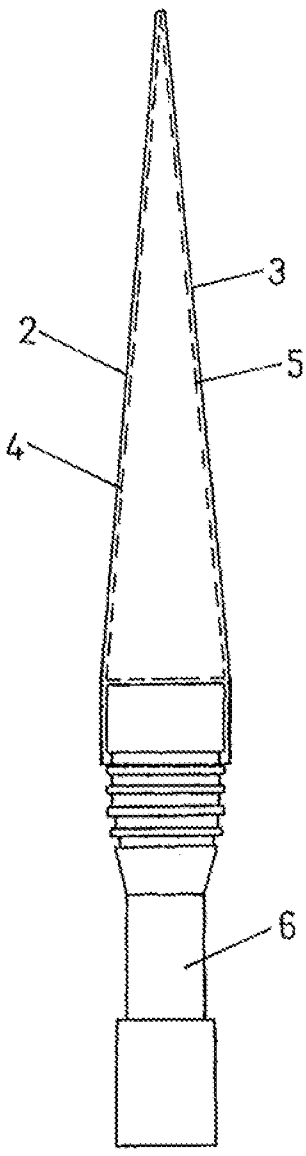
FIG. 8 shows the signalling element of FIG. 7 adapted to a lamp being fitted in the static position.

Likewise, it can be seen how element 1 can be coupled to a lamp 6 just by pressing the larger base, according to the arrows "A" so that the element opens, as represented in FIG. 3 with layers 4 and 5 backed onto the internal faces of the laminar body 2-3.

Moreover, given that the pair of layers 4 and 5 are reflecting with or without coloration, in low visibility conditions they permit incident light to be reflected and thus obtain adequate visibility.

Furthermore, element 1 coupled to lamp 6 permits efficient diffusion of the light permitting its use in other applications such as for obtaining diffuse light.

In short, by using signalling element 1 a device with very diverse applications of use is presented and which can be used for:

- signalling, regulation and directing of vehicle traffic;
- signalling, regulation and directing of air and sea traffic;
- signalling, regulation and directing of railway traffic;
- marking and signalling by the military, the police, emergency personnel, etc.;
- portable light source for camps and similar, and;
- portable light source for situations of low visibility.

The invention claimed is:

1. A signaling device, for adapting to a light emitter, the signaling device comprising:

an external double laminar body formed from a flexible plastic material and being extended by a larger base so as to form a straight section, and configured to be in a folded position where the double laminar body is collapsed; said external double laminar body is configured to open from said folded position via said larger base to provide an interior and a generally tronco-conical shape, for adapting the light emitter to said interior at said larger base, and together forming said signaling device, said external double laminar body further housing two flexible plastic layers of PVC in said interior for directing emitted light to the outside, wherein said light emitter also functions as a handle for said signaling device.

2. A signalling device according to claim 1, wherein the external double laminar body defines a space for housing the two flexible plastic.

3. A signalling device according to claim 1, wherein the external double laminar body is formed from a flexible transparent plastic material.

4. A signalling device, according to claim 1, wherein the two flexible plastic layers are formed from a reflecting and translucent PVC plastic material.

5. A signalling device according to claim 1, wherein the two flexible plastic layers are formed with or without coloration.

6. A signalling device according to claim 1, wherein when the external double laminar body formed from flexible transparent plastic material is adapted to the light emitter, the external double laminar body is sufficiently rigid so as to enable static mounting, via the larger base.

7. A signalling element according to claim 2, wherein when the external double laminar body formed from flexible transparent plastic material is adapted to the light emitter, the external double laminar body is sufficiently rigid so as to enable static mounting, via the larger base.

8. A signalling element according to claim 3, wherein when the external double laminar body formed from flexible transparent plastic material is adapted to the light emitter, the external double laminar body is sufficiently rigid so as to enable static mounting, via the larger base.

9. A signalling element according to claim 4, wherein when the external double laminar body formed from flexible transparent plastic material is adapted to the light emitter, the external double laminar body is sufficiently rigid so as to enable static mounting, via the larger base.

10. A signalling element according to claim 5, wherein when the external double laminar body formed from flexible transparent plastic material is adapted to the light emitter, the external double laminar body is sufficiently rigid so as to enable static mounting, via the larger base.

* * * * *